April 9, 1929.   A. BARCLAY   1,708,825
FISH LURE
Filed Oct. 4, 1927

INVENTOR
ARTHUR BARCLAY
BY
ATTORNEYS

Patented Apr. 9, 1929.

1,708,825

UNITED STATES PATENT OFFICE.

ARTHUR BARCLAY, OF NORTH VANCOUVER, BRITISH COLUMBIA, CANADA.

FISH LURE.

Application filed October 4, 1927. Serial No. 223,969.

My invention relates to improvements in fish lures the objects of which are to provide means whereby the movements of a small fish, such as might be used for bait, are simulated, whereby it is caused to oscillate and to travel through the water along a substantially horizontal path and to dart first to one side and then to the other. A further object is to provide means whereby the hooks extending to the rear of the lure are swivelly mounted that they may turn without disturbing the equilibrium of the lure, if required.

The invention consists of a tubular member adapted to be attached to a fishing line and having one or more hooks extending from one end, as will be more fully shown in the accompanying drawings, and described in the following specification, in which:—

In the drawings like characters of reference indicate corresponding parts in each figure.

Figure 1:
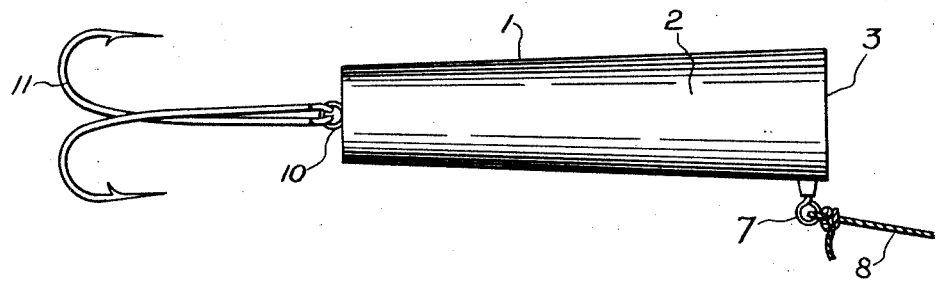
Fig. 1 is a general view of the invention.
Figure 2:
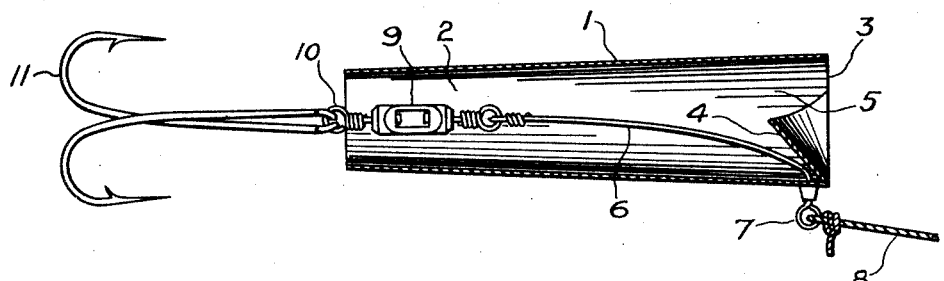
Fig. 2 is a longitudinal section showing the manner in which the hooks are connected to the lure.

The numeral 1 indicates generally the lure which consists of an open ended tubular member 2 which is preferably tapered to present its larger diameter at the forward end 3. The member 2 will be formed of any suitable material having or capable of receiving a suitable lustre to attract the fish sought.

In the forward end of the tubular member 2 a baffle or deflector 4 is provided, which is formed concavoconvex in transverse section and is rearwardly and upwardly inclined from the lowermost forward edge of the tubular member, terminating at substantially half the vertical height thereof, so as to define a passage 5 over which the water entering the forward end 3 of the tube must flow in its passage to the rear thereof.

A wire 6 is passed through the forward lower edge of the member 2 and bent to form an eye 7 by which the lure is secured to the fishing line 8. The wire is soldered or otherwise secured to the member adjacent the eye to prevent endwise movement thereof. To the rear end of the wire 6 a swivel 9 is secured, which is so disposed as to be almost wholly enclosed within the member, but preferably having the rear eye 10 thereof projecting to facilitate replacements. Secured to the eye 10 is a pair of hooks 11. The wire 6 is preferably tempered and curved to hold the hooks normally out of contact with the sides of the tubular member, so that the drag of the hooks through the water will not unduly influence the set of the tubular member.

Having thus described the several parts of my invention, I will now briefly explain its function.

As the lure 1 is drawn through the water by the line 8 it assumes a substantially horizontal position, the weight of the rear end of the tubular member 2 and the hooks tending to incline the lure with its forward end uppermost, whereas the action of the water entering the tubular member and impinging upon the deflector 4 tends to depress the forward end equally with the gravity pull upon the rear end, hence the normal running position is substantially horizontal. It is thought that the increased velocity of water flow through the tubular member due to its reduction in cross sectional area towards the rear end, tends to induce an oscillating movement of the lure and also to hold it on one tack steadily until the increasing side pull on the line diverts it from the one tack and onto another.

What I claim as my invention is:

1. A fish lure comprising a tubular casing open at the ends for the passage of water therethrough, a deflector extending transversely across and closing the lower half of the casing at the forward end, said deflector being inclined rearwardly and upwardly and being curved in the transverse direction of the casing to provide a concave surface opposing the direction of flow through the casing, a line attached to the forward end portion of the casing and a hook arranged in trailing relation to the rear end of said casing.

2. A fish lure comprising a casing open at the ends for the passage of water therethrough, a wire extending longitudinally within the casing and having its forward terminal directed laterally through the wall of the casing adjacent the forward end of the casing and formed to provide an eye disposed exteriorly of the casing, said wire being secured to the casing at the point where it passes therethrough, a hook arranged in trailing relation to the rear end of the casing, a swivel connecting said hook to the rear end of the wire to permit the hook to revolve without imparting corresponding movement to the casing, a line attached to said eye and a longitudinally curved upwardly and rearwardly inclined deflector mounted in the lower half of the forward end of the casing to provide a concave surface opposing the direction of flow through the casing.

3. A fish lure comprising a tubular casing open at the ends for the passage of water therethrough and made of gradually decreasing diameter toward the rear end, a deflector closing the lower half of the forward end of the casing and presenting an upwardly and rearwardly inclined concave deflecting surface opposing the direction of flow through the casing, a hook arranged in trailing relation to the rear end of the casing and a swivel connection between the hook and the casing permitting the hook to revolve without imparting corresponding movement to the casing.

Dated at Vancouver, B. C., this 27th day of September, 1927.

ARTHUR BARCLAY.